United States Patent
Karp et al.

Patent Number: 6,073,452
Date of Patent: Jun. 13, 2000

[54] RAPID CHILLING OF FOODSTUFFS

[76] Inventors: Charles D. Karp, 3434 W. Los Gatos Dr., Phoenix, Ariz. 85027; James D. Sullivan, 9561 E. Presidio Rd., Scottsdale, Ariz. 85260

[21] Appl. No.: 09/137,584

[22] Filed: Aug. 21, 1998

[51] Int. Cl.[7] ............... F25D 25/00; F25D 3/00
[52] U.S. Cl. ................................. 62/62; 62/293
[58] Field of Search ......................... 62/293, 62

[56] References Cited

U.S. PATENT DOCUMENTS

| | | | |
|---|---|---|---|
| 1,852,219 | 4/1932 | Sahnow et al. | 62/293 |
| 1,992,988 | 3/1935 | Blahnik | 62/293 |
| 2,159,907 | 5/1939 | Morris | 62/293 |
| 2,319,429 | 5/1943 | Nelson et al. | 62/293 |
| 3,146,608 | 9/1964 | Carpenter | 62/293 |
| 3,820,597 | 6/1974 | Bittner et al. | 165/109 |
| 5,135,355 | 8/1992 | Colley et al. | |
| 5,365,750 | 11/1994 | Greenthal | 62/293 |
| 5,472,274 | 12/1995 | Baillie. | |
| 5,931,018 | 8/1999 | Hall et al. | 62/331 |

FOREIGN PATENT DOCUMENTS

| 2550843 | 5/1977 | Germany | 62/293 |
|---|---|---|---|

*Primary Examiner*—William Doerrler
*Attorney, Agent, or Firm*—Marshall, O'Toole, Gerstein, Murray & Borun

[57] ABSTRACT

Apparatus for the rapid chilling of foodstuffs contained within an open top container including a chilling device connected to a source of refrigerant. The refrigerant source operates to cool the connected chilling device to a first predetermined temperature. After insertion of the chilling device into foodstuff contained within the container, the chilling device may be agitated to reduce the foodstuff temperature to at least a second predetermined value.

7 Claims, 2 Drawing Sheets

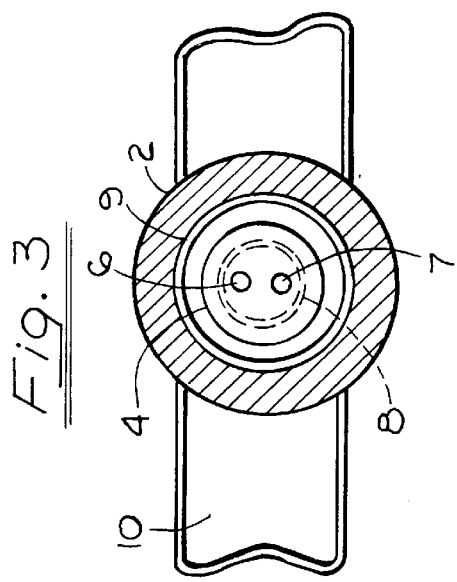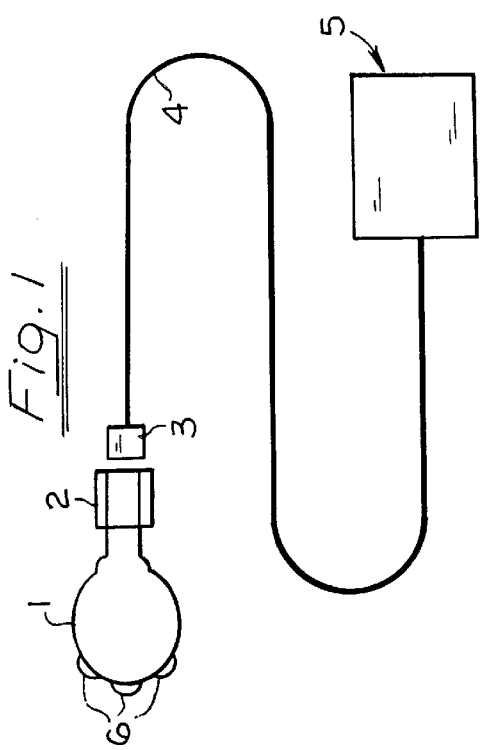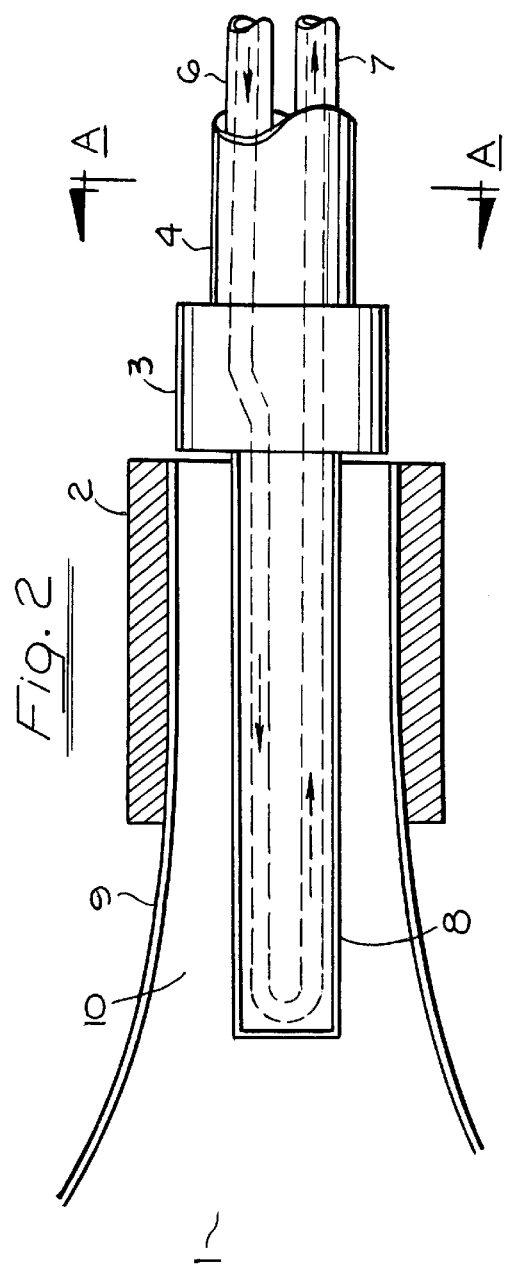

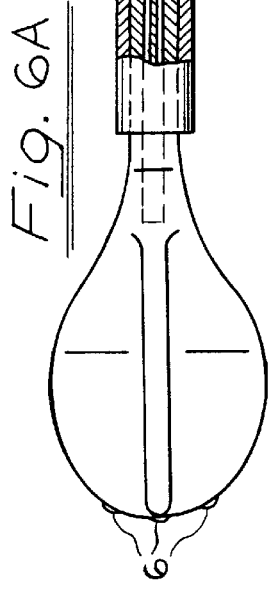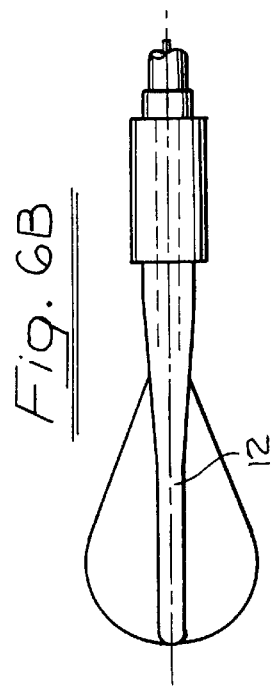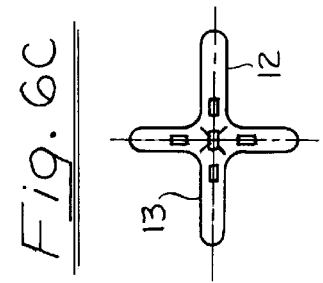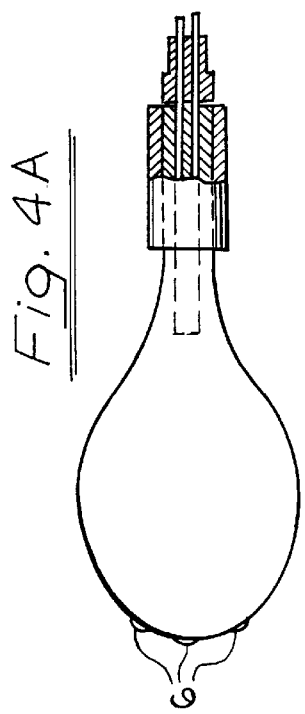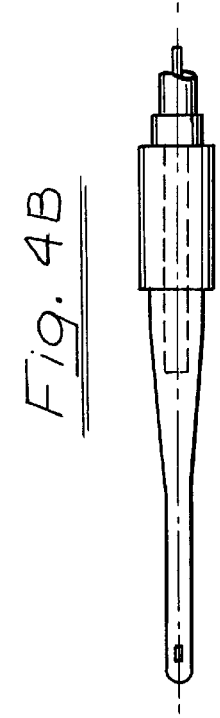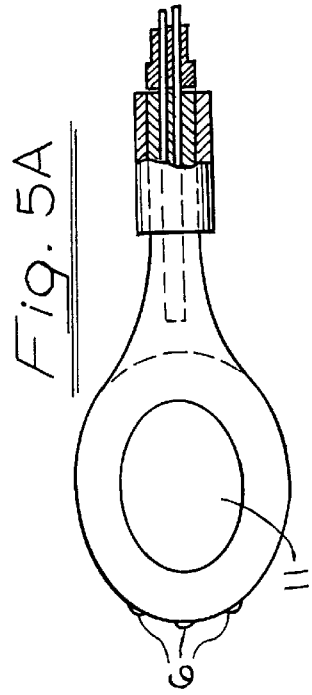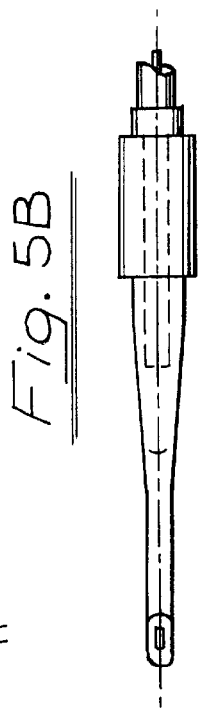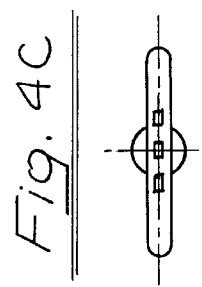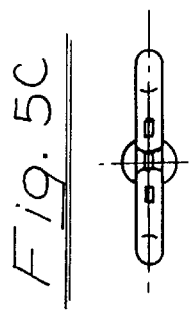

RAPID CHILLING OF FOODSTUFFS

BACKGROUND OF THE INVENTION

1. Field of the Invention

The present invention relates to food processing. More particularly, the present invention relates to the rapid chilling of foodstuffs in order to lower temperatures in order that harmful bacteria cannot form in the foodstuffs in question.

2. Background Art

Food service professionals are increasingly concerned about the process of food preparation and storage as it relates to the production of hazardous bacteria. This is particularly true in that instance where the temperature at which prepared foods are being held pending more permanent refrigerated storage. This concern obviously is compounded by the amount of time it takes to reach the desired storage temperature from the cooking temperature.

As one instance of concern in this area, the United States Government has instituted a new program to monitor the process of food preparation and has, in turn, recommended guidelines under a program entitled, "Hazardous Appraisal Controlling Critical Procedures" or "HACCP". This program involves some seven principles set forth as follows:

Principle #1 Assess the Hazards

Principle #2 Identify the Critical Control Points

Principle #3 Establish Procedures to Address the Critical Control Points

Principle #4 Monitor the Critical Control Points

Principle #5 Take Corrective Action if Critical Control Point is Breached

Principle #6 Establishing a Record Keeping System

Principle #7 A Verification Program

In reviewing the application of the above program to food preparation, questions are raised, "Does the program work?" Consequently, should the recipe be altered containing fewer steps? Or, is the training program addressing the critical control points appropriately? An additional question is raised, "Are front line employees empowered to take the necessary corrective action to correct the critical control point to remove food from service?" Finally, is there a cost saving by using the "Hazardous Appraisal Controlling Critical Procedures"?

The usual solutions for inhibiting the growth of bacteria in food preparation today suggest that the temperature of prepared food must be lowered to at least 41° F. or below as quickly as possible after removal from heat and definitely in no longer than four hours elapsed time. Currently, this is accomplished by placing the prepared food in ice baths and continuously monitoring the process until the desired temperature is reached. This method, of course, is labor intensive and very time consuming. The existing margin for error runs very high and when errors do occur, hazardous conditions are easily produced in the food product A search of the background art directed to the subject matter of the present invention conducted in the U.S. Patent and Trademark Office disclosed the following U.S. Letters Patent:

3,820,597, issued Jun. 28, 1974, discloses a mixer having a device for the cooling of powdered granular liquid, or otherwise flowable material to be mixed. The patent teaches a rotating mixing element associated with a container connected to a cooling source. A paddle-shaped mixing element rotates within the cooling container.

5,135,355, issued Aug. 4, 1994, teaches a rotor to provide the heat to circulate a substance comprising a shaft with two electrically connected elements utilized to provide heat to the product.

5,472,274, issued Dec. 5, 1995, discloses a pitcher with a cooling element included therein as well as a stirring assembly to effect agitation and stirring of the material contained within the pitcher.

A thorough review of the above-identified patents has concluded that none are believed to claim, teach, or disclose the particular novel combinations of elements and functions set forth in the present invention. All of the cited patents are for different purposes or environments. Accordingly, it is the object of the present invention to provide an improved food chilling apparatus that facilitates the lowering of prepared food temperatures, evenly, and economically.

SUMMARY OF THE INVENTION

As indicated previously, the temperature of prepared food to effectively overcome the tendency for foods to produce bacteria, is accomplished by lowering the temperature to 41° F. or lower as quickly as possible after removal from any heat employed in preparing the food mixture. It is the intent that the lowering of the temperature be accomplished within four hours to meet industry standards.

The present invention is intended to facilitate the lowering of prepared food temperatures quickly, easily, and economically by greatly reducing the amount of time required to lower the temperature, usually from hours to minutes. In the present invention, hazardous bacteria will not form and labor costs are substantially reduced as less monitoring and handling is required of the food being processed. In the usual manner, after the desired temperature has been reached, long term refrigerated storage of the food product is possible.

The present system utilizes a paddle, or spoon-like chilling device made of copper, stainless steel, or any similar materials which are useful in conducting cold temperatures. The device is connected to a hose with a connector through which a refrigerant material flows from and returns to a commercially available refrigeration source. The controls are located typically as might be expected on the refrigeration or power source in a manner well known at the present time. Connected to the hose, which has connections to the refrigeration unit, is a cooling element which is inserted into the handle of the present chilling device. It has been found that the cooling element of the present invention is able to achieve a −20° F. temperature usually within 15 minutes after the refrigeration source is activated. The low temperature generated is then transferred from the element to the paddle-like device by means of conduction.

The hose-like connection between the refrigeration unit and the chilling device is flexible, insulated, reinforced and includes two internal tubes for supply and return of refrigerant from a commercially available refrigeration unit. The one end of the hose conductor obviously is connected to the refrigeration source.

It has been found most desirable for the chilling device to have an insulated handle. This insulated handle facilitates its utilization by the user in operating the device. The user manually grasps the insulated handle portion placing the chilling device into the food substance to be cooled effectively transferring the cold from the chilling device to the food to be treated.

It has also been found desirable to provide a plastic or ceramic coating over the copper, stainless steel, or similar material to provide a protection from certain substances (i.e., acids, caustic materials, etc.).

The connector from the hose to the chilling device includes a quick-disconnect feature of conventional construction which allows for easy and rapid connection and disconnection.

The chilling device of the present invention may be found in a variety of rigid forms configured to fit the shape and size of the vessel in which it is to be utilized. Consideration is also given to the consistency of the food to be chilled. Each of the chilling devices typically includes standoffs on the outside bottom of the device which allow it to rest in a vessel with a minimum surface contact with the bottom of the vessel. Thus, the device is positioned a minimum distance above the vessel containing the food.

It has been found useful for the straight paddle-like device described to have additional fins attached to the device at 90° angles to provide additional contact surface.

Similarly, where the intent is to utilize the present invention in a relative-thin material, such as soups, etc., it may be desirable to have a substantial opening in the center of the paddle-like device, whereby the food to be chilled can easily be passed through the paddle as well as around it.

With the hose connected directly to the refrigeration source, it provides a sealed, closed loop through which the refrigerant will flow.

It will be obvious from the foregoing that the device of the present invention is connected via a hose to a refrigeration unit, then it is submerged into warm or hot prepared food to quickly reduce the foodstuff temperature. Movement of the device within the substance may be all that is required to facilitate the process. After the temperature of the food is lowered sufficiently. The chilled food is then placed in a refrigerator or freezer for temporary or permanent storage.

It will be obvious from the foregoing that the chilling device of the present invention may be connected to a motor source so that agitation may be accomplished pneumatically or electrically.

It is believed that the present invention facilitates the transport of prepared foods from a central kitchen to distribution outlets by reducing the time required between preparation and transport. A portable unit located in the vehicle could maintain the desired temperature during transport.

Finally, it can be observed that the intent of the present invention is to greatly reduce the bacteria-producing risks associated with food preparation. Thus, the present invention can be found to increase productivity and efficiency in the kitchen by eliminating the necessity of cooling down prepared food by means of ice baths and/or shallow pans placed in ice or refrigeration environments. The object of the present invention provides a substantial reduction in a labor intensive activity that is time consuming and requires continuous monitoring of food temperatures and related conditions wherein bacteria may be generated.

BRIEF DESCRIPTION OF THE DRAWINGS

Preferred embodiments of the present invention will be described in detail with reference to accompanying drawings wherein:

FIG. 1 is a stylized schematic diagram of a food cooling system for rapid reduction of food mixes in accordance with the present invention.

FIG. 2 is an enlarged partial sectional view of the chilling device of the present invention showing in detail the cooling element which is connectable to a source of refrigeration.

FIG. 3 is a sectional drawing of the chilling device of the present invention taken along line A–A' through FIG. 2.

FIGS. 4A, 4B, and 4C respectively show the top view, side view, and end view of a basic form of the chilling device as set forth in the present invention.

FIGS. 5A, 5B, and 5C respectively show the top view, side view, and end view of an alternate form of the chilling device of the present invention. This version shows a substantial opening in the center of the device through which food products may pass during the chilling operation.

FIGS. 6A, 6B, and 6C respectively show the top view, side view and end view of a third alternate form of the chilling device of the present invention wherein extra fins are included on the paddle device located at right angles to the principal paddle portion to effective provide greater surface for chilling of food mixes to be cooled.

DETAILED DESCRIPTION OF THE PREFERRED EMBODIMENT

Referring first to FIG. 1, the present invention is shown in schematic form wherein a chilling device 1 having a number of standoff elements 14 usually of metal or plastic, attached to the bottom surface thereof, has an insulated handle 2 to grasp by a cook/chef or other user, and is connected to a hose 4 through quick-connect connector 3. The other end of the hose 4 is connected to a refrigeration unit 5 of conventional design which provides the refrigerant medium through a pair of tubes contained within hose 4 to the cooling element 8 in the chilling device 1.

The chilling or refrigeration unit 5 is a conventionally designed unit and commercially available, including a 110 V or 220 V compressor operated to utilize approved types of refrigerant. Length of hose 4 from the refrigeration unit 5 to the chilling device 1 is typically six feet.

As can be seen in FIGS. 2 and 3, hose 4 which is flexible, insulated, and reinforced has two internal tubes 6 and 7 for the supply and return of the refrigerant to and from the refrigeration unit 5. The hose 4 is connected to the chilling device 1 by means of a quick-connect connector 3 of conventional design. The chilling device 1 is constructed of material such as copper, stainless steel, or similar metals, as well as any plastic materials, which readily provide a high coefficient of thermal conduction from the refrigeration unit to the cooling element 8 through which the refrigerant has passed. Should the device be constructed of metal, it may be desirable to have a coating 9 of plastic, ceramic, or similar material to provide adequate protection for the chilling device 1 from foodstuffs having a high acid or caustic content.

As can be seen in FIGS. 2 and 3, the chilling device 1 has attached near the base thereof an insulated handle usually of plastic which facilitates the manual use of the device when it is introduced into food or foodstuff mixtures wherein it is desirable to reduce the temperature to acceptable standard levels, to provide a chill before placing them in a refrigeration or freezer environment.

The chilling device of the present invention may be connected to a motor source so that agitation may be accomplished pneumatically or electrically.

Several embodiments of the chilling device of present invention are shown in FIGS. 4, 5, and 6. FIG. 4 discloses a straight paddle-like form of the present invention, while 5A shows a similar form where an opening is placed through the center of the paddle facilitating the passage of foodstuffs through the center as well as the outside of the device.

The final embodiment of the present invention is shown in FIG. 6A where the chilling device contains additional fins 12 and 13 as can be readily seen in FIGS. 6B and 6C. All the embodiments shown contain standoffs 6 located on the base of each to facilitate resting of the device on the bottom of the mixing vessel so that a minimum surface is in contact with the bottom of the vessel in which food is contained.

It will be obvious from the foregoing that the elements may be configured in various shapes and may be further configured with fins or openings for greater temperature exchange.

While but a few embodiments of the present invention have been shown, it will be obvious to those skilled in the art that numerous modifications may be made without departing from the spirit of the present invention, which shall be limited only by the scope of the claims appended hereto.

What is claimed is:

1. A paddle like chilling apparatus for the rapid chilling of foodstuffs contained within an open container, said paddle like chilling apparatus comprising:

a substantially flat chilling device in the form of a racquet having a paddle like front portion for insertion into said foodstuff and a handle rear portion for movement of the chilling device in the foodstuff;

said paddle like front portion formed of a heat conductive metal with a metal exterior surface surrounding said paddle like front portion and defining an enclosed interior of the chilling device and said metal exterior surface extending to form said handle rear portion on a unitary structure;

said handle rear portion including an elongated interior cooling chamber for receiving a refrigerant;

said elongated interior cooling chamber extending from an open end into the enclosed interior of the paddle like front portion;

an elongated cooling element insertable into the elongated interior cooling chamber of the handle rear portion immediately adjacent and in heat conductive position with said heat conductive metal forming said paddle like front portion; and said elongated cooling element including a closed loop cooling tube member for coupling to a source of refrigerant suitable for removing heat from said foodstuffs conducted through said metal exterior surface of said paddle like front portion for rapidly chilling said foodstuffs.

2. The chilling apparatus of claim 1, including a flexible hose containing said closed loop cooling member, and a quick-connect connector at one end of said hose connecting the hose to the handle rear portion of said chilling device.

3. The chilling apparatus of claim 1, including an insulating member surrounding said handle rear portion to heat insulate a user's hand from the heat conductive metal exterior surface.

4. The chilling apparatus of claim 2, including at least one standoff on said paddle like front portion to facilitate minimum contact between the bottom of said open container and said chilling device.

5. The chilling apparatus of claim 1, wherein said paddle like front portion is in the form of a donut with a central opening to enable said foodstuff to pass through said central opening during movement of the chilling device through the foodstuff.

6. The chilling apparatus of claim 1, wherein said paddle like front portion includes fins.

7. The chilling apparatus of claim 1, including motor means for agitating movement of said chilling device in said foodstuffs.

\* \* \* \* \*